United States Patent
Wang et al.

(10) Patent No.: US 7,595,980 B2
(45) Date of Patent: Sep. 29, 2009

(54) MULTI-CONFIGURATION PORTABLE ELECTRONIC DEVICE AND GUIDING MODULE THEREOF

(75) Inventors: John C. Wang, Taoyuan (TW); Ching-Shih Chen, Taoyuan (TW); Chin-Chung Shih, Taoyuan (TW); Yun-Long Tun, Taoyuan (TW); Yi-Shen Wang, Taoyuan (TW); Ming-San Huang, Taoyuan (TW)

(73) Assignee: HTC Corporation, Taoyuan County (TW)

( * ) Notice: Subject to any disclaimer, the term of this patent is extended or adjusted under 35 U.S.C. 154(b) by 375 days.

(21) Appl. No.: 11/538,110

(22) Filed: Oct. 3, 2006

(65) Prior Publication Data

US 2007/0121303 A1    May 31, 2007

(30) Foreign Application Priority Data

Nov. 30, 2005   (TW) .............................. 94142163 A

(51) Int. Cl.
G06F 1/16 (2006.01)
H05K 5/00 (2006.01)
H05K 7/20 (2006.01)

(52) U.S. Cl. ................. 361/679.27; 16/367; 455/575.1; 455/575.3

(58) Field of Classification Search ................. 361/681, 361/683, 679.21, 679.26, 679.27; 235/450; 16/367; 455/575.1, 575.3
See application file for complete search history.

(56) References Cited

U.S. PATENT DOCUMENTS

| | | | | |
|---|---|---|---|---|
| 6,728,557 | B1 * | 4/2004 | Tracy et al. | 455/575.3 |
| 7,283,355 | B2 * | 10/2007 | Han | 361/683 |
| 7,447,527 | B2 * | 11/2008 | Lin et al. | 455/575.1 |
| 2004/0127266 | A1 * | 7/2004 | Aagaard et al. | 455/575.3 |
| 2005/0020325 | A1 * | 1/2005 | Enger et al. | 455/575.3 |
| 2005/0078444 | A1 * | 4/2005 | Hong | 361/683 |
| 2005/0083644 | A1 * | 4/2005 | Song | 361/683 |
| 2005/0128695 | A1 * | 6/2005 | Han | 361/683 |
| 2005/0168923 | A1 | 8/2005 | Huang et al. | |
| 2005/0215297 | A1 * | 9/2005 | Aoki | 455/575.3 |
| 2006/0112519 | A1 * | 6/2006 | Harmon et al. | 16/367 |
| 2007/0133156 | A1 * | 6/2007 | Ligtenberg et al. | 361/681 |

FOREIGN PATENT DOCUMENTS

CN    1536459 A    10/2004
EP    1429524 A1 *  6/2004

* cited by examiner

Primary Examiner—Jayprakash N Gandhi
Assistant Examiner—Adrian S Wilson

(57) ABSTRACT

A multi-configuration portable electronic device including a first body, a second body, a dual-axis hinge and at least a guiding module is provided. The dual-axis hinge has a first axis pivotally coupled to the first body and a second axis pivotally coupled to the second body. The guiding module prevents the first axis and the second axis from acting simultaneously. The guiding module includes a track disposed in the first body and a slide connected with the second body. The slide has an interaction force with the track so that the slide can move from the second body to couple with the track.

16 Claims, 4 Drawing Sheets

MULTI-CONFIGURATION PORTABLE ELECTRONIC DEVICE AND GUIDING MODULE THEREOF

RELATED APPLICATIONS

The present application is based on, and claims priority from, Taiwan Application Serial Number 94142163, filed Nov. 30, 2005, the disclosure of which is hereby incorporated by reference herein in its entirety.

BACKGROUND

1. Field of Invention

The present invention relates to a portable electronic device and a guiding module thereof, and more particularly, to a multi-configuration portable electronic device and a guiding module thereof.

2. Description of Related Art

Portable electronic devices, such as cell phones, personal digital assistants, notebook computers, video-game devices and media players are widely used and have recently become popular with the public. Integrating different portable functions and increasing the functions in a single portable electronic device are the trend of development of the portable electronic device. However, different portable electronic devices usually have different displays and the input type, for example a cell phone usually has a standard numerical keypad and an upright screen, and a notebook computer has a lateral screen with a more complex keyboard.

A multi-configuration portable electronic device including a dual-axis hinge has already been developed. One axis of the dual-axis hinge acts when the multi-configuration portable electronic device is in a landscape configuration or in a portrait configuration. However, the conventional multi-configuration portable electronic device has some disadvantages. For example, the axes of the dual-axis hinge form protruded structures on the surface of the multi-configuration portable electronic device when the multi-configuration portable electronic device is opened. Those protruded structures influence the appearance and operating convenience of the multi-configuration portable electronic device.

Moreover, when the conventional multi-configuration portable electronic device is opened, the axes of the dual-axis hinge are prevented from acting simultaneously, which may place the device in an abnormal state.

SUMMARY

It is an aspect of the present invention to provide a multi-configuration portable electronic device, which can be used in a landscape configuration or a portrait configuration according to the needs of users, in order to increase the device value.

It is another aspect of the present invention to provide a multi-configuration portable electronic device, which has no protruded structures thereon, so as to obtain a good appearance and enhance the operating convenience for users.

It is still another aspect of the present invention to provide a guiding module, which can be disposed on a multi-configuration portable electronic device to prevent the multi-configuration device from acting in an abnormal state.

Accordingly, the present invention provides a multi-configuration portable electronic device that includes a first body, a second body, a dual-axis hinge and at least one guiding module. The dual-axis hinge has a first axis pivotally coupled to the first body and a second axis pivotally coupled to the second body. The guiding module prevents the first axis and the second axis from acting simultaneously. The guiding module includes a track disposed in the first body and a slide connected with the second body. The slide has an interaction force with the track so that the slide can move from the second body to couple with the track.

According to preferred embodiments, the guiding module includes an elastic device disposed between the second body and the slide in order to retract the slide into the second body.

According to preferred embodiments, the elastic device comprises a spring.

According to preferred embodiments, the first axis is not coplanar with the second axis.

According to preferred embodiments, the track includes a track base disposed in the first body and a cylinder disposed on the track base.

According to preferred embodiments, the track base has an arc-shaped track disposed thereon.

According to preferred embodiments, the slide has a first U-shaped coupling portion coupled with the cylinder and a second U-shaped coupling portion coupled with the arc-shaped track.

According to preferred embodiments, the track includes a decorative slide disposed on the arc-shaped track.

According to preferred embodiments, the second body has at least one positioning pin and the slide has at least a hole, so that the elastic device and the first slide can be disposed in the second body.

According to preferred embodiments, the first body includes an input device and the second body includes a display.

According to preferred embodiments, the interaction force comprises a magnetic force.

The present invention also provides a guiding module applied to a portable electronic device with a first body and a second body. The guiding module includes a track disposed in the first body and a slide connected to the second body. The slide has an interaction force with the track so that the slide can move from the second body to couple with the track.

According to preferred embodiments, the dual-axis hinge has a first axis pivotally coupled to the first body and a second axis pivotally coupled to the second body. The multi-configuration portable electronic device can be used in a landscape configuration or a portrait configuration according to the needs of users.

According to preferred embodiments, the multi-configuration portable electronic device has a guiding module, which can be disposed on a multi-configuration portable electronic device to prevent the axes of the dual-axis hinge from acting simultaneously and ensure the multi-configuration portable electronic device acts in a proper way.

According to preferred embodiments, the first axis is not coplanar with the second axis and the guiding module has an elastic device to retract the slide into the second body. Therefore, the dual-axis hinge and the guiding module would not form a protruded structure on the multi-configuration portable electronic device.

It is to be understood that both the foregoing general description and the following detailed description are by examples and are intended to provide further explanations of the invention as claimed.

BRIEF DESCRIPTION OF THE DRAWINGS

These and other features, aspects and advantages of the invention will become apparent by reference to the following description and accompanying drawings, which are given by way of illustration only, and thus are not limitative of the invention, wherein.

DESCRIPTION OF THE PREFERRED EMBODIMENTS

Figure 1:
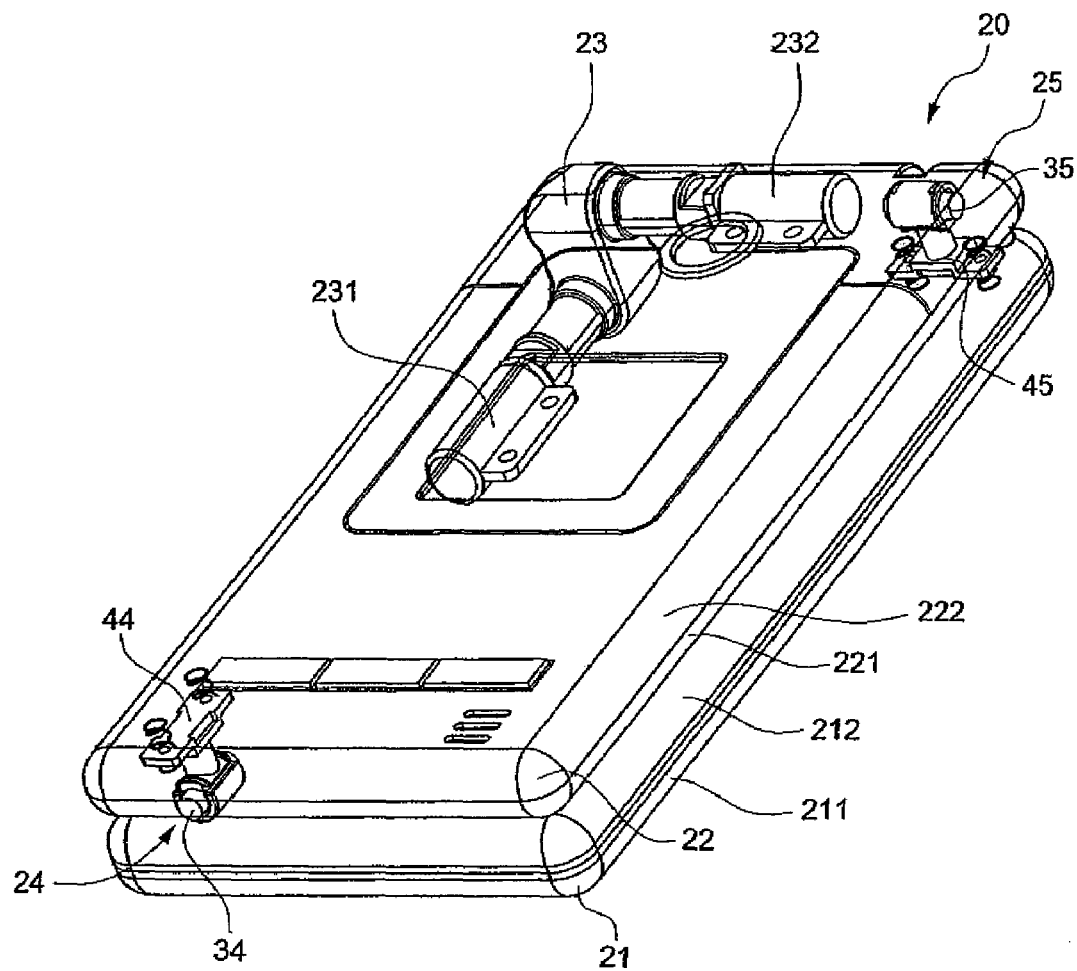
FIG. 1 illustrates a preferred embodiment of the multi-configuration portable electronic device in a closed configuration according to the present invention.

FIG. 1 illustrates a preferred embodiment of the multi-configuration portable electronic device according to the present invention. Referring to FIG. 1, the multi-configuration portable electronic device 20 in a closed configuration includes a first body 21, a second body 22, a dual-axis hinge 23 having a first axis 231 and a second axis 232, a first guiding module 24 and a second guiding module 25. The first axis 231 is pivotally coupled to the first body 21 and the second axis 232 is pivotally coupled to the second body 22. The multi-configuration portable electronic device 20 cab be operated in a landscape configuration and a portrait configuration, in the former, the second body 22 rotates on the first axis 231, in the latter, the second body 22 rotates on the second axis 232. The first axis 231 is not coplanar with the second axis 232. Therefore, the first axis 231 and the second axis 232 would not form a protruded structure on the first body 21 or the second body 22.

With continued reference to FIG. 1, multi-configuration portable electronic device 20 includes a first guiding module 24 with a first track 34 and a first slide 44 and a second guiding module 25 with a second track 35 and a second slide 45. The first track 34 is disposed in the first body 21 and the first slide 44 is connected with the second body 22. The second track 35 is disposed in the second body 22 and the second slide 45 is connected with the first body 21. When the multi-configuration portable electronic device 20 is in the closed configuration, the first slide 44 is coupled with the first track 34 and the second slide 45 is coupled with the second track 35.

Figure 2:
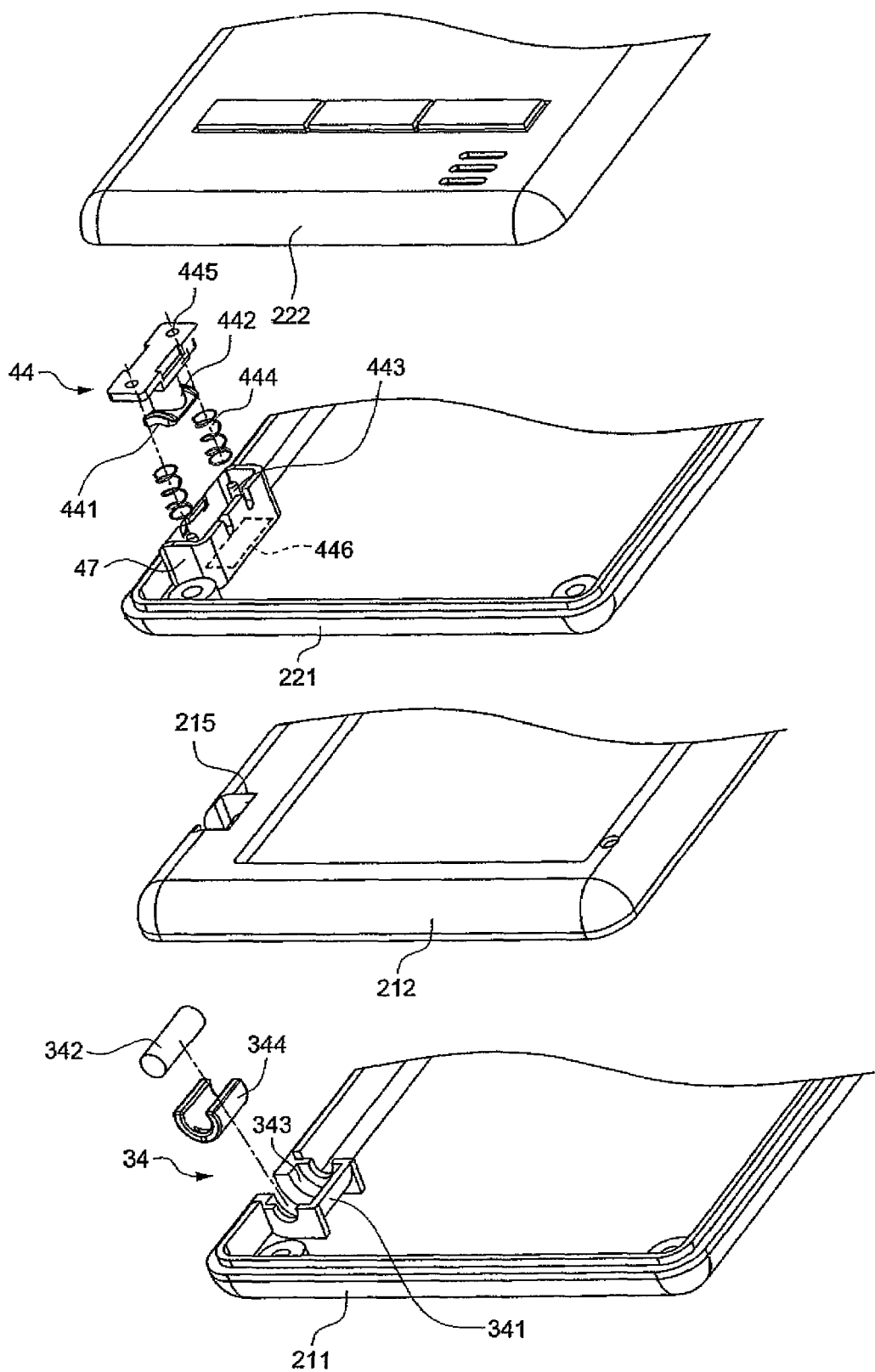
FIG. 2 is a part schematic and exploded view of the multi-configuration portable electronic device in FIG. 1.

FIG. 2 is a part, schematic, exploded view of the multi-configuration portable electronic device in FIG. 1. Referring to FIG. 1 and FIG. 2, the first track 34 includes a track base 341 disposed on the first housing 211 and a cylinder 342 disposed on the track base 341. The track base 341 has an arc-shaped track 343 disposed thereon. The first slide 44 has a first U-shaped coupling portion 441 adapted to couple with the cylinder 342 and a second U-shaped coupling portion 442 adapted to couple with the arc-shaped track 343 respectively.

Referring to FIG. 1 and FIG. 2, an interaction force between the first track 34 and the first slide 44 causes the first slide 44 to move from a first location 47 of the first housing 211 and couple with the first track 34. For example, the cylinder 342 is made of a magnetic material and the first slide 44 is made of magnetic susceptible material. When the first slide 44 approaches the first track 34, the first slide 44 and the cylinder 342 are mutually attracted such that the first slide 44 can pass through the opening 446 of the third housing 221, the opening 215 of the second housing 212 and couple with the cylinder 342. When the first axis 231 rotates, the first U-shaped coupling portion 441 and the second U-shaped coupling portion 442 of the first slide 44 are coupled with the cylinder 342 and the arc-shaped track 343 respectively.

With continued reference to FIG. 1 and FIG. 2, at least one elastic device 444, such as a spring, is disposed between the second body and the first slide 44 in order to retract the first slide 44 into the second body 22. For example, the third housing has at least one positioning pin 443. The elastic device 444 is disposed on the positioning pin 443. Besides, the first slide 44 has at least one hole 445. The positioning pin 443 perforates the elastic device 444 and the hole 445, so that the elastic device 444 and the first slide 44 can be disposed in the second body 22. Accordingly, when the first slide 44 is apart from the first track 34, the first slide 44 is pushed by the elastic device 444 and retracted into the second body 22. Hence, the first slide 44 would not form a protruded structure on the second body 22. It is worth noting that the second slide 45 is similar to the first slide 44.

With continued reference to FIG. 2, the first track 34 has a decorative slide 344 disposed on the arc-shaped track 343. When the first slide 44 is coupled with the first track 34, the first slide 44 can push the decorative slide 344 so as to prevent the cylinder 342 from being exposed and improving the appearance of the multi-configuration portable electronic device 20.

Figure 3:
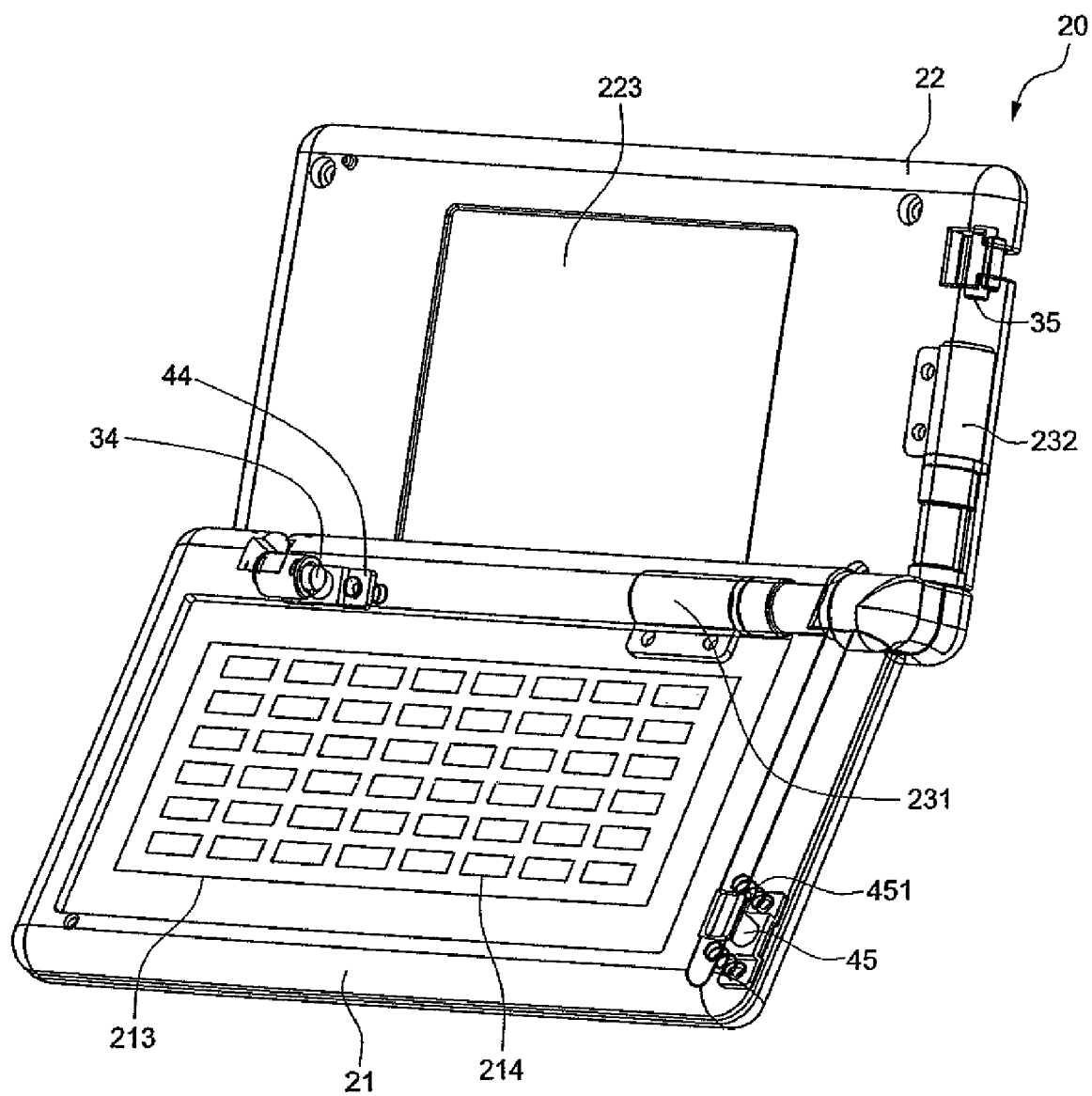
FIG. 3 is a schematic perspective view of the multi-configuration portable electronic device in a landscape configuration.

FIG. 3 is a schematic perspective view of the multi-configuration portable electronic device in FIG. 1, which is in the landscape configuration. Referring to FIG. 3, the first body 21 includes an input device 213 having a plurality of buttons 214 and the second body 22 includes a display 223. When the first axis 231 acts, the first slide 44 is coupled with the first track 34 and the second slide 45 is separated from the second track 35. The first slide 44 and the first track 34 constrain the rotation of the second axis 232 so as to guide the multi-configuration portable electronic device 20 to be in the landscape configuration. Moreover, the second slide 45 is pushed by the elastic device 451 and retracted into the first body 21. Hence, the second slide 45 would not form a protruded structure on the first body 21. The multi-configuration portable electronic device 20 is suitable for viewing a wide document and utilizing the input device 213 to input data in the landscape configuration.

Figure 4:
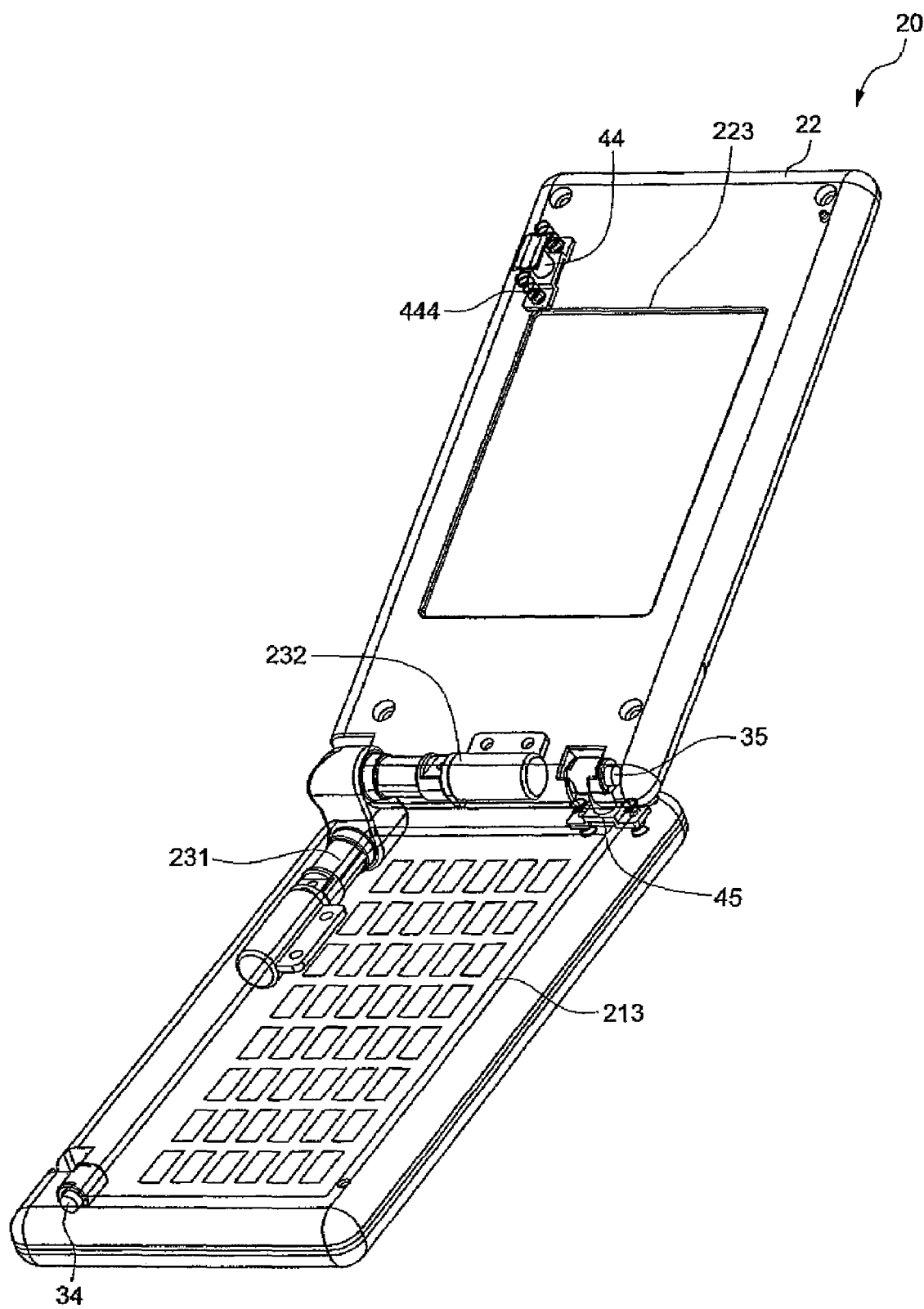
FIG. 4 is a schematic perspective view of the multi-configuration portable electronic device in a portrait configuration.

FIG. 4 is a schematic perspective view of the multi-configuration portable electronic device in FIG. 1, which is in the portrait configuration. Referring to FIG. 4, when the second axis 232 acts, the second slide 45 is coupled with the second track 35 and the first slide 44 is separated from the first track 34. The second slide 45 and the second track 35 constrain the rotation of the first axis 231 so as to guide the multi-configuration portable electronic device 20 to be in the portrait configuration. Moreover, the first slide 44 is pushed by the elastic device 444 and retracted into the second body 22. Hence, the first slide 44 would not form a protruded structure on the second body 22. The multi-configuration portable electronic device 20 is suitable for viewing a long document and utilizing the input device 213 to input a phone number and receive a phone call in the portrait configuration.

According to preferred embodiments mentioned above, the present invention has the following advantages. Firstly, the dual-axis hinge has a first axis pivotally coupled to the first body and a second axis pivotally coupled to the second body. The multi-configuration portable electronic device can be used in a landscape configuration or a landscape configuration according to the needs of users. Secondly, the multi-configuration portable electronic device has a guiding module, which can be disposed on a multi-configuration portable electronic device to prevent the axes of the dual-axis hinge from acting simultaneously and ensure the multi-configuration portable electronic device acts in a proper state. Thirdly, the first axis is not coplanar with the second axis and the guiding module has an elastic device to retract the slide into the second body. Therefore, the dual-axis hinge and the guiding module would not form a protruded structure on the multi-configuration portable electronic device.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A multi-configuration portable electronic device comprising:
   a first body;
   a second body;
   a dual-axis hinge having a first member rotatable about a first axis and a second member rotatable about a second axis, the first member being pivotally coupled to the first body, the second member being pivotally coupled to the second body;
   at least one guiding module configured to prevent the first member and the second member from rotating simultaneously, the guiding module comprising:
      a track having a cylinder, the track disposed in the first body; and an extendible slide having a U-shaped coupling portion, the extendible slide disposed in the second body and configured to move from the second body to magnetically engage the track, wherein the U-shaped coupling portion of the extendible slide is configured to engage the cylinder whereby the extendible slide is enabled to rotate with respect to the track when the extendible slide is coupled with the track.

2. The multi-configuration portable electronic device of claim 1, wherein the guiding module comprises an elastic device disposed between the second body and the extendible slide is configured to retract the slide into the second body.

3. The multi-configuration portable electronic device of claim 2, wherein the elastic device comprises a spring.

4. The multi-configuration portable electronic device of claim 1, wherein the first axis is not coplanar with the second axis.

5. The multi-configuration portable electronic device of claim 1, wherein the track comprises a track base disposed in the first body and the cylinder is disposed on the track base.

6. The multi-configuration portable electronic device of claim 5, wherein the track base has an arc-shaped track disposed thereon.

7. The multi-configuration portable electronic device of claim 6, wherein the track comprises a decorative slide disposed on the arc-shaped track.

8. The multi-configuration portable electronic device of claim 1, wherein the second body has at least one positioning pin and the slide has at least a hole, so that the elastic device and the first slide can be disposed in the second body.

9. A multi-configuration portable electronic device comprising:
   a first body;
   a second body;
   a dual-axis hinge having a first member rotatable about a first axis and a second member rotatable about a second axis, the first member being pivotally coupled to the first body, the second member being pivotally coupled to the second body;
   at least one guiding module configured to prevent the first axis member and the second member from rotating simultaneously, the guiding module comprising:
   a track disposed in the first body;
   an extendible slide disposed in the second body and configured to move from the second body to magnetically engage and rotate within the track when the extendible slide is magnetically coupled to the track; and
   an elastic device disposed between the second body and the extendible slide in order to retract the extendible slide into the second body;
   wherein the first axis is not coplanar with the second axis;
   wherein the extendible slide includes a U-shaped coupling portion, and the track includes a cylinder, wherein the U-shaped coupling portion is configured to engage and rotate about the cylinder when the extendible slide is coupled with the track.

10. A guiding module being applied to a portable electronic device with a first body and a second body, the guiding module comprising:
    a track disposed in the first body;
    an extendible slide connected with the second body and configured to move from the second body to magnetically engage and rotate within the track when the extendible slide is magnetically attracted by the track; and
    at least one elastic device disposed between the second body and the extendible slide, the elastic device configured to retract the extendible slide into the second body when the extendible slide does not couple with the track;
    wherein the extendible slide includes a U-shaped coupling portion, and the track includes a cylinder, wherein the U-shaped coupling portion is configured to engage and rotate about the cylinder when the extendible slide is coupled with the track.

11. The guiding module of claim 10, wherein the elastic device comprises a spring.

12. The guiding module of claim 10, wherein the track comprises a track base disposed in the first body and the cylinder is disposed on the track base.

13. The guiding module of claim 12, wherein the track base has an arc-shaped track disposed thereon.

14. The guiding module of claim 13, wherein the extendible slide has a second U-shaped coupling portion coupled with the arc-shaped portion coupled with the arc-shaped track.

15. The guiding module of claim 13, wherein the track comprises a decorative slide disposed on the arc-shaped track.

16. The guiding module of claim 10, wherein the second body has at least one positioning pin and the slide has at least a hole, so that the elastic device and the first slide can be disposed in the second body.

* * * * *